United States Patent
Frankel et al.

(10) Patent No.: US 11,750,531 B2
(45) Date of Patent: Sep. 5, 2023

(54) FPGA-BASED VIRTUAL FABRIC FOR DATA CENTER COMPUTING

(71) Applicant: Ciena Corporation, Hanover, MD (US)

(72) Inventors: Michael Y. Frankel, Bethesda, MD (US); John P. Mateosky, West River, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 29 days.

(21) Appl. No.: 16/250,091

(22) Filed: Jan. 17, 2019

(65) Prior Publication Data

US 2020/0236064 A1 Jul. 23, 2020

(51) Int. Cl.
| | |
|---|---|
| *H04L 49/10* | (2022.01) |
| *H04L 49/00* | (2022.01) |
| *H04L 67/10* | (2022.01) |

(52) U.S. Cl.
CPC .............. *H04L 49/10* (2013.01); *H04L 49/70* (2013.01); *H04L 67/10* (2013.01)

(58) Field of Classification Search
CPC . H04B 1/0003; H04B 1/0028; H04L 63/0428; H04L 67/2861; H04L 49/10; H04L 49/70; H04L 67/10; G06F 30/34; G06F 9/5072
See application file for complete search history.

(56) References Cited

U.S. PATENT DOCUMENTS

| | | | |
|---|---|---|---|
| 5,970,232 A | 10/1999 | Passint et al. | |
| 6,973,559 B1 | 12/2005 | Deneroff et al. | |
| 7,345,991 B1* | 3/2008 | Shabtay | H04L 45/28 709/239 |
| 7,436,775 B2 | 10/2008 | Jordan et al. | |
| 7,483,998 B2 | 1/2009 | Rabinovitch | |
| 9,124,383 B1 | 9/2015 | Frankel et al. | |
| 2007/0101242 A1* | 5/2007 | Yancey | G06F 13/4256 714/776 |
| 2008/0092146 A1* | 4/2008 | Chow | G06F 15/173 719/313 |
| 2008/0278197 A1* | 11/2008 | Murotake | G06F 9/4401 326/38 |
| 2008/0317039 A1* | 12/2008 | Satterlee | H04L 12/1886 370/395.5 |

(Continued)

OTHER PUBLICATIONS

An FPGA-Based Measurement Generator for Cyclically Shifted Binary Signals, Gordon et al., IEEE Proceedings (Year: 2018).*

*Primary Examiner* — Hanh N Nguyen
(74) *Attorney, Agent, or Firm* — Baratta Law PLLC; Lawrence A. Baratta, Jr.

(57) ABSTRACT

A data center fabric includes a plurality of Field Programmable Gate Arrays (FPGAs), each FPGA interconnected by a plurality of links with other FPGAs, a plurality of servers in a data center, and physical network functions associated with the data center, wherein the plurality of FPGAs form a virtual fabric for switching between the FPGAs, the plurality of servers, and the physical network functions, and wherein the virtual fabric is arranged in a compound graph and a flat network with each FPGA being a node and a diameter of the compound graph and the flat network is indicative of a maximum number of hops for a packet through the virtual fabric.

17 Claims, 9 Drawing Sheets

(56) References Cited

U.S. PATENT DOCUMENTS

| | | | |
|---|---|---|---|
| 2009/0067324 A1* | 3/2009 | Licardie | H04L 45/22 370/225 |
| 2011/0051624 A1* | 3/2011 | Gnanasekaran | H04L 45/583 370/254 |
| 2014/0056594 A1* | 2/2014 | Ding | H04L 1/0057 398/136 |
| 2014/0304543 A1* | 10/2014 | Ilyas | G06F 1/12 713/401 |
| 2015/0076923 A1 | 3/2015 | Frankel et al. | |
| 2015/0125112 A1 | 5/2015 | Frankel et al. | |
| 2015/0172112 A1* | 6/2015 | Itkin | H04L 45/245 370/254 |
| 2015/0339252 A1* | 11/2015 | Anderson | H04L 9/38 380/43 |
| 2016/0050470 A1* | 2/2016 | Swinkels | H04L 41/04 398/45 |
| 2016/0056914 A1* | 2/2016 | Gareau | H04J 3/1652 398/52 |
| 2016/0097857 A1* | 4/2016 | Gokay | G01S 17/42 356/5.01 |
| 2016/0301593 A1 | 10/2016 | Blair et al. | |
| 2016/0344629 A1* | 11/2016 | Gray | H04L 49/106 |
| 2017/0195758 A1* | 7/2017 | Schrans | H04Q 11/0066 |
| 2017/0262567 A1* | 9/2017 | Vassiliev | H03K 19/17704 |
| 2018/0123980 A1 | 5/2018 | Frankel et al. | |
| 2018/0332541 A1* | 11/2018 | Liu | H04W 52/146 |
| 2019/0123997 A1* | 4/2019 | Peng | H04L 45/24 |
| 2019/0138890 A1* | 5/2019 | Liang | G06N 3/08 |
| 2019/0158939 A1* | 5/2019 | Frankel | H04B 10/25 |
| 2019/0250941 A1* | 8/2019 | Rooke | G06F 9/5072 |
| 2019/0307014 A1* | 10/2019 | Adiletta | G06F 21/44 |
| 2019/0326992 A1* | 10/2019 | Charlton | H04B 10/40 |
| 2019/0363523 A1* | 11/2019 | Claussen | H02G 3/088 |
| 2020/0004983 A1* | 1/2020 | Chen | H04L 63/0428 |
| 2020/0177525 A1* | 6/2020 | Morris | H04L 41/0681 |
| 2020/0192723 A1* | 6/2020 | Lei | G06F 9/28 |
| 2020/0336337 A1* | 10/2020 | Williams | H04L 12/46 |

* cited by examiner

FPGA-BASED VIRTUAL FABRIC FOR DATA CENTER COMPUTING

FIELD OF THE DISCLOSURE

The present disclosure generally relates to networking and computing architectures. More particularly, the present disclosure relates to a Field Programmable Gate Array (FPGA)-based virtual fabric for data center computing.

BACKGROUND OF THE DISCLOSURE

The Data Center market is experiencing rapid growth which will accelerate with the introduction of 5G Radio Access Network (RAN) technologies, an expanding range of demanding network use cases (Internet of Things (IoT), 4G/5G RAN, Augmented Reality (AR)/Virtual Reality (VR), Artificial Intelligence (AI) processing, etc.), and the like. Conventional architectures are well-known including rack servers connected to Top of Rack (TOR) switches, connected to Leaf/Spine switches, etc. Generally, conventional architectures rely on proprietary networking appliances with discrete functionality. However, the evolution is towards a new networking paradigm with programmability and flexibility. In order to provide a programmable infrastructure, networking functions were virtualized onto generic Central Processing Unit (CPU)-based servers, including virtualized switching (like Open Virtual Switch—OVS), virtual firewalls, virtual load balancers, etc. However, generic CPUs, while extremely flexible and programmable, are frequently unable to provide the required levels of throughput, especially when the CPU had to perform a substantial amount of switching and/or routing.

As such, FPGA-based solutions have been proposed to provide a programmable and efficient infrastructure for assuming a network interface role. An example includes a Smart Network Interface Card (NIC), which is designed to fully and transparently offload the entire virtual switch data path processing for networking functions such as overlays, security, load balancing and telemetry, enabling compute servers used for server-based networking to deliver at their full potential. However, the balance of processing is still heavily tilted towards Central Processing Unit (CPU) or Graphics Processing Unit (GPU) centric processing. A typical data path may take one of several possibilities: a) direct to a Wide Area Network (WAN) connection is low latency and efficient, but bypasses the programmable infrastructure, b) when only a few Virtual Network Functions (VNF) are deployed, the path drops down to a single server for processing and has modest switching overhead, c) a high VNF count path transits through the TOR switch and NICs several times in order to access VNFs in multiple servers and is very inefficient.

There is a need to provide an FPGA-based virtual fabric which improves the processing capability, reduces latency, reduces power consumption of chained VNFs while preserving the dynamic and programmable aspects.

BRIEF SUMMARY OF THE DISCLOSURE

In an embodiment, a data center fabric includes a plurality of Field Programmable Gate Arrays (FPGAs), each FPGA interconnected by a plurality of links with other FPGAs, a plurality of servers in a data center, and physical network functions associated with the data center, wherein the plurality of FPGAs form a virtual fabric for switching between the FPGAs, the plurality of servers, and the physical network functions, and wherein the virtual fabric is arranged in a compound graph and a flat network with each FPGA being a node and a diameter of the compound graph and the flat network is indicative of a maximum number of hops for a packet through the virtual fabric. The compound graph can have clusters of localized FPGA nodes that have a smaller diameter relative to the compound graph based on port assignment between intra-cluster and inter-cluster communication. The plurality of FPGAs can be utilized for switching functions in lieu of a leaf/spine architecture in the data center. The plurality of FPGAs can be utilized for switching functions, Virtual Network Functions (VNFs), and for replacing one or more of the plurality of servers. The flat network can include partial interconnectivity between the plurality of FPGAs. The plurality of links can include one or more of high-speed electrical interconnects and optical interconnects.

The plurality of FPGAs can be on a first module, and the plurality of links include a first set of links for interconnection between the plurality of FPGAs on the first module, and a second set of links for interconnection between the first module and a second module with a second plurality of FPGAs. The second set of links can be over a backplane associated with a shelf housing the first module and the second module. The plurality of links can further include a third set of links for interconnection between the first module in a first shelf and a third module in a second shelf. The plurality of links which interconnect the plurality of FPGAs can be a Link Aggregation Group (LAG).

In another embodiment, a network element includes one or more circuit packs, each circuit pack including a plurality of Field Programmable Gate Arrays (FPGAs), each FPGA interconnected by a plurality of links with FPGAs, a plurality of servers in a data center, and physical network functions associated with the data center; and a shelf with a backplane communicatively coupling the one or more circuit packs to one another, wherein the plurality of FPGAs form a virtual fabric for switching between the FPGAs, the plurality of servers, and the physical network functions, and wherein the virtual fabric is arranged in a compound graph and a flat network with each FPGA being a node and a diameter of the compound graph and the flat network indicative is of a maximum number of hops for a packet through the virtual fabric. The compound graph can have clusters of localized FPGA nodes that have a smaller internal diameter relative to the compound graph based on port assignment between intra-cluster and inter-cluster communication. The flat network can include partial interconnectivity between the plurality of FPGAs. The network element can further include a second shelf with a backplane communicatively coupling a second set of one or more circuit packs to one another, wherein the second set of one or more circuit packs each include a plurality of FPGAs. Each circuit pack of the one or more circuit packs and the second set of one or more circuit packs can be a node in the compound graph. The plurality of links which interconnect the plurality of FPGAs can be in a Link Aggregation Group (LAG).

In a further embodiment, a method includes operating a first set of links to interconnect a plurality of Field Programmable Gate Arrays (FPGAs); operating a second set of links between the plurality of FPGAs and a plurality of servers in a data center; operating a third set of links between the plurality of FPGAs and physical network functions associated with the data center; and performing packet switching in the plurality of FPGAs between the plurality of FPGAs, the plurality of servers, and the physical network functions, wherein the plurality of FPGAs form a virtual fabric, and wherein the virtual fabric is arranged in a compound graph and a flat network with each FPGA being a node and a diameter of the compound graph and the flat network is indicative of a maximum number of hops for a packet through the virtual fabric. The compound graph can have clusters of localized FPGA nodes that have a smaller internal diameter relative to the compound graph based on port assignment between intra-cluster and inter-cluster communication. The flat network can include partial interconnectivity between the plurality of FPGAs. The plurality of links which interconnect the plurality of FPGAs can be in a Link Aggregation Group (LAG).

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a block diagram of a virtual network fabric building block containing four FPGAs mesh interconnected on a single circuit pack" or something similar;

DETAILED DESCRIPTION OF THE DISCLOSURE

Figure 1:
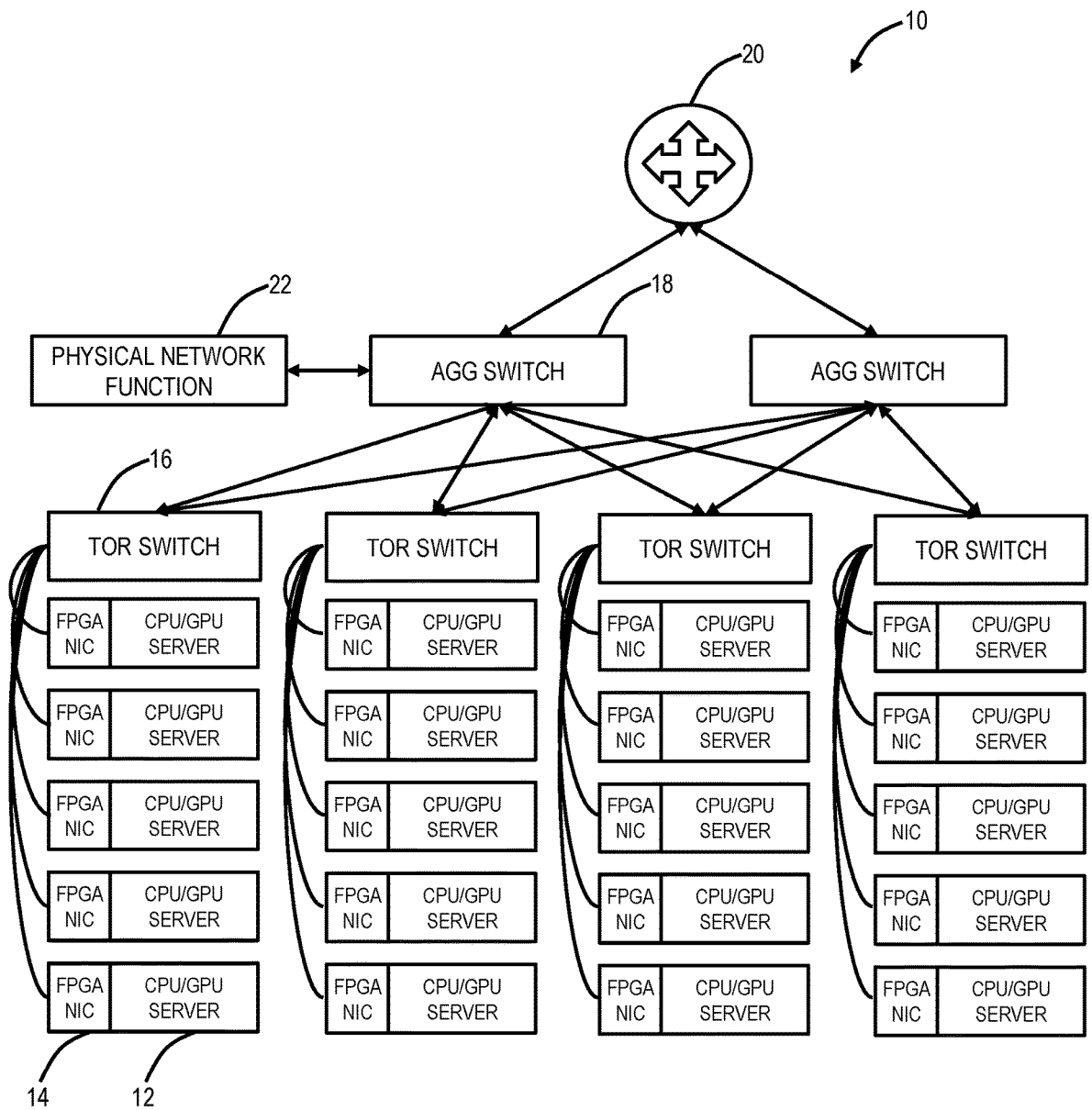
FIG. 1 is a network diagram of a conventional data center network.

The present disclosure relates to a Field Programmable Gate Array (FPGA)-based virtual fabric for data center computing. The virtual fabric is a new architecture for data center computing which utilizes an FPGA-based virtualized and programmable infrastructure for efficient data processing. An example application is at the network edge, where end-user traffic is aggregated and processed before being transported into the core network and centralized data centers. Of course, the same approach could be used in centralized data centers, as well as in Access WAN network design. The switching function is completely pulled into the FPGA-based fabric (such as using Open vSwitch, P4 or other constructs). Advantageously, this approach eliminates the separate Leaf/Spine (i.e., Clos) network switching layer. Also, additional processing functions may be moved to the FPGA layer from CPUs. The virtual fabric enables global optimization on both data routing and VNF placement.

The virtual fabric includes a flat interconnect architecture (using a general construct of a "compound graph" graph type among multiple FPGAs to provide an efficient, low diameter network to minimize data traversal across expensive and power-hungry Serializer/Deserializer (SERDES) and links. Each FPGA is a node in the network of the virtual fabric, and a diameter is a worst-case number of hops a packet takes through the network. Increasing port count improves connectivity, but also increases cost and interconnect complexity. Networks can be made uniform as well as "compound graph" type networks with a variety of embedded clusters of compact and localized FPGA nodes. These clusters of FPGAs may have preferentially smaller internal diameter by assigning specific ports for intra-cluster communications and the remaining ports for inter-cluster communications. FPGAs within clusters can be placed in extremely close physical proximity of each other, ensuring lower power requirements and latency preferentially for intra-cluster communications. While flat, the architecture still provides efficient connections on a single board, across the electrical backplane, and across longer reach optical links for large scalability.

The FPGA layer is programmable and incorporates i) switching functions (using P4 for example) dynamically optimized in both placement and sizing to accommodate desired VNFs and data processing functions, ii) VNFs and other processing functions optimized in size and location to improve resource utilization, performance, and lower power and latency, iii) an expandable 'virtual FPGA' where multiple FPGAs can appear as a single programmable resource, and iv) modern FPGAs which provide High Bandwidth Memory (HBM) which is integrated onto an interposer substrate with FPGA die, allowing for very fast Dynamic Random Access Memory (DRAM) access with low power consumption.

FPGAs can provide direct interconnect to edge Physical Medium Attachment Sublayer (PMA)/Physical (PHY) sublayer functions and corresponding required signal processing. FPGAs inherently support virtually any signaling protocol and can be re-configured partially (a subset of the chip) or fully (whole chip), or programmed to span multiple chips. Partial reconfiguration at the sub-system or port level can be done without disturbing the other operating channels and protocols. This enables runtime reconfiguration of the fabric's data plane. The virtual fabric includes minimized use of underlying CPU/GPU resources, and when necessary can use embedded FPGA CPU cores, in both hard-macro and soft-core forms, (ARM, PowerPC, etc.) and already embedded Digital Signal Processor (DSP) blocks for Graphics Processing Unit (GPU) specific functions. Internal data routing may be done via a distributed "compound graph"-like approach, or via more centralized approaches like Segment Routing, including congestion avoidance mechanisms. Blade/board variations could support both high-speed electrical interconnect (backplane) as well as optical interconnects (e.g. ones being developed by Consortium for Onboard Optics (COBO)) for density and high bandwidth North/South (WAN) interconnection as well as alternate high bandwidth rack expansion and PNF (physical network function) interconnect, directly. Existing FPGA families from the major vendors support optical interconnects, advanced packaging and dense interposer-based stacked die approach today (e.g., SamTec Firefly). COBO-based architectures are seen to provide up to a 30% power savings due to simpler short-range electrical SERDES between the FPGA and COBO modules, as well as form-factor (size) improvements.

Optical interconnects may also be envisioned that are more tightly integrated with the FPGA die itself, using multi chip packaging technology. FPGA die and optical interfaces can be coupled via extremely short electrical traces, thereby substantially reducing overall system cost, size and power consumption.

Data Center

FIG. 1 is a network diagram of a conventional data center network 10. In this example, the data center network 10 includes a plurality of servers 12 which can include FPGA-based NICs 14. Typically, a group of servers 12 are in a common rack and connect to an associated Top of Rack (TOR) switch 16. The TOR switches 16 connect to aggregation switches 18 which can connect to a larger switch 20. This approach is referred to as leaf/spine (leaves are the aggregation switches 18, and the spine is the switch 20), Fat-Tree/Clos, etc. A physical network function 22 can communicate to any of the servers 12 via the leaf/spine switches. There are several problems with this current state of art approach in support of VNFs and in support of low latency applications required for the expanding use cases at the edge of the network. CPU-based VNFs are very inefficient and consume a lot of cores, power, and introduce large service latency. The Fat-Tree/Clos type networking architecture introduces substantial inefficiency—many transits through switching fabrics and corresponding cost, power and latency penalties.

Figure 2:
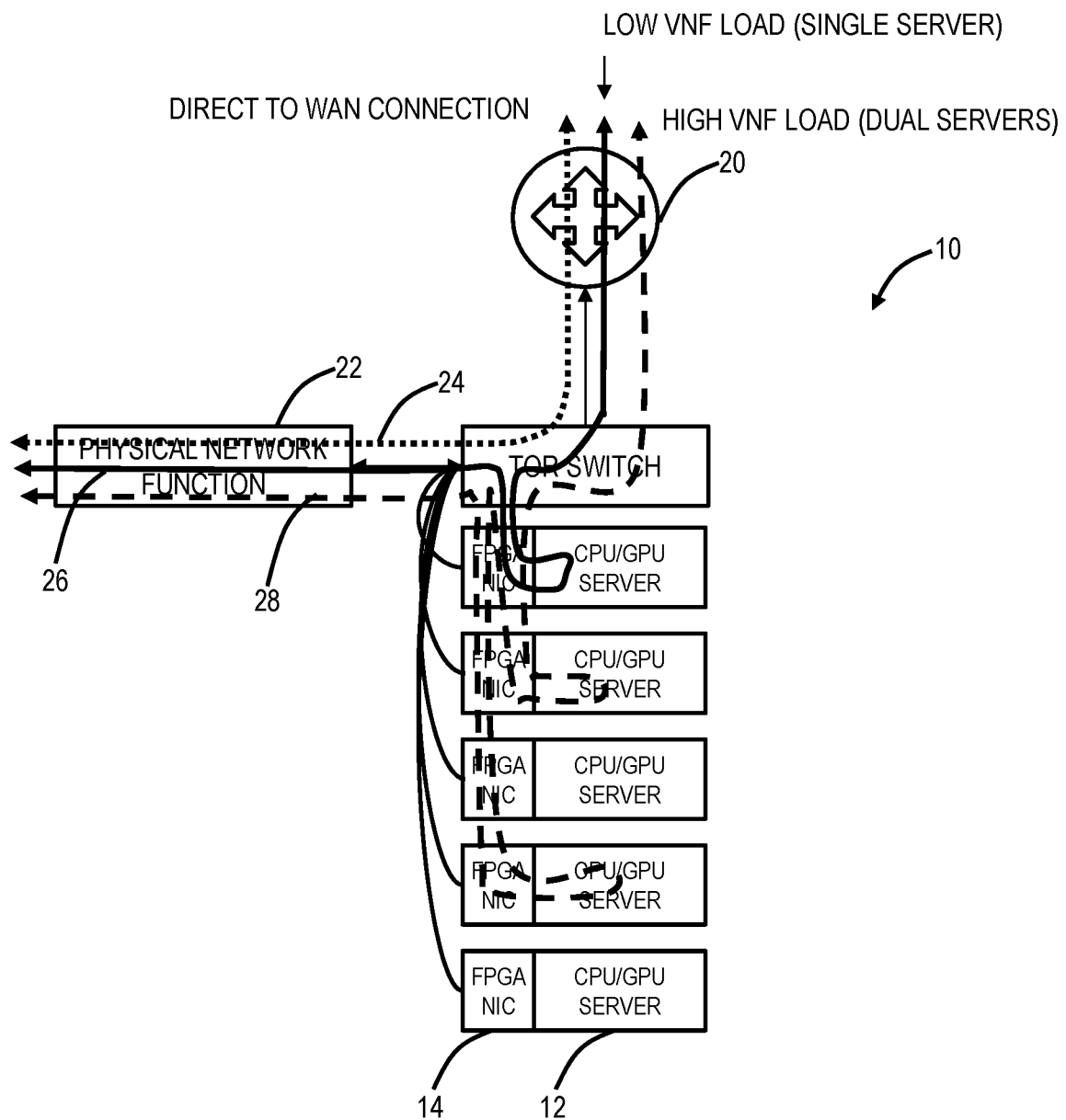
FIG. 2 is a network diagram of a subset of the conventional data center network of FIG. 1.

FIG. 2 is a network diagram of a subset of the conventional data center network 10. As described herein, the balance of processing is still heavily tilted towards CPU or GPU centric processing in the data center network 10. A typical data path may take one of several possibilities: a) a direct to WAN connection 24 is low latency and efficient but bypasses the programmable infrastructure, b) a low VNF count path 26 drops down to a single server for processing and has modest switching overhead, c) a High VNF count path 28 transits through the TOR switch and NICs several times in order to access VNFs in multiple servers and is very inefficient. When the number of servers 12 exceed that supportable by a single switch (TOR switch 16), a Fat Tree or Clos architecture is typically used to interconnect multiple TOR switches 16, with additional higher layer switches used as needed for further expansion. This architecture further exacerbates the problem of cost, power and delay of extra layers of switching introduced into the architecture.

Data Center with the Virtual Fabric

Figure 3:
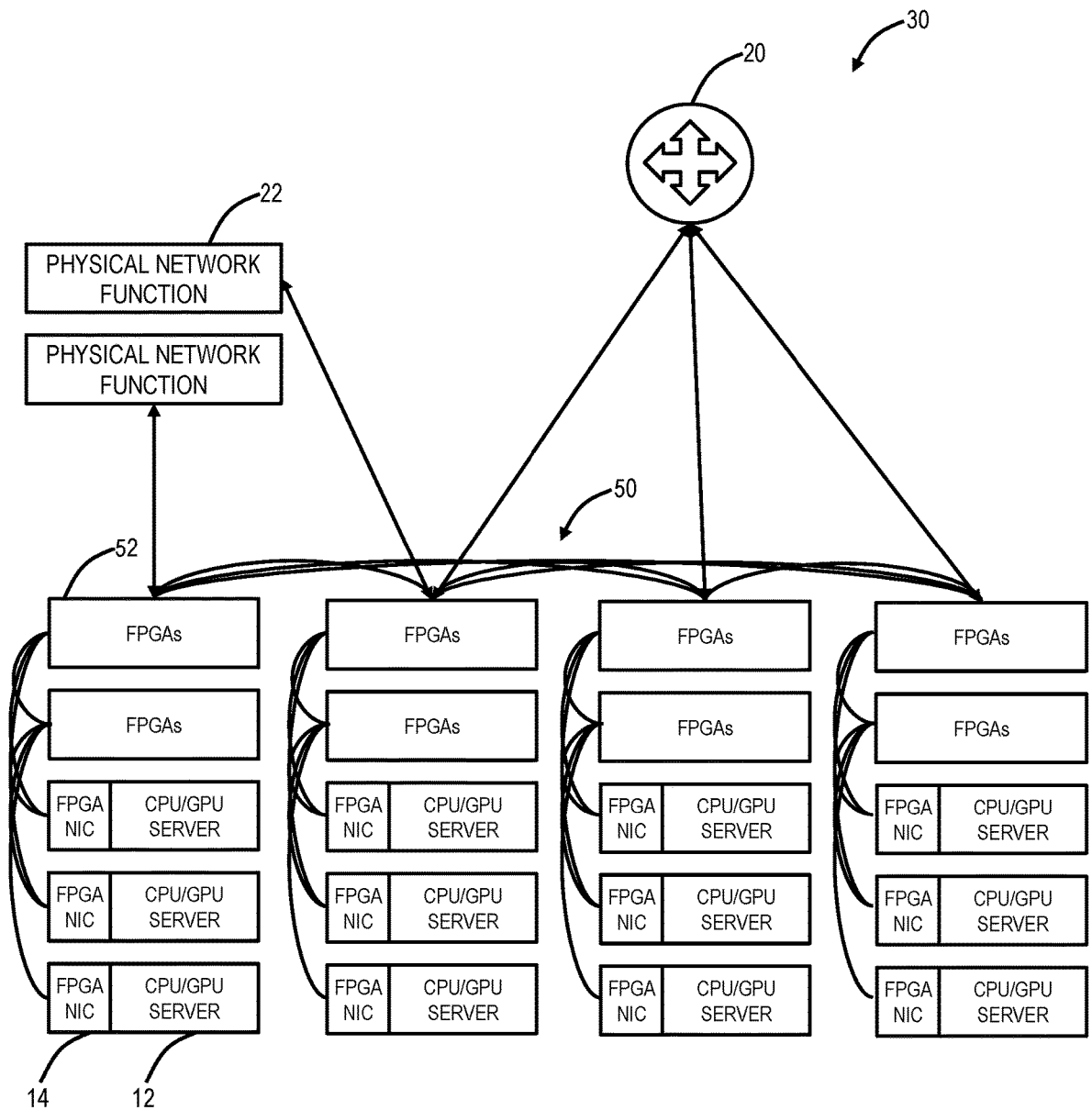
FIG. 3 is a network diagram of a data center including a virtual fabric.

FIG. 3 is a network diagram of a data center 30 including a virtual fabric 50. The virtual fabric 50 includes a plurality of FPGAs 52 which may be implemented on circuit packs, in a chassis, in a rack, etc. The virtual fabric 50 includes an FPGA-based virtualized and programmable infrastructure for efficient data processing. As described herein, an application is at the network edge for the virtual fabric 50, where end-user traffic is aggregated and processed before being transported into the core network and centralized data centers. However, the same approach could be used in centralized data centers, as well as in Access WAN network design.

Specifically, the virtual fabric 50 in the data center 30 replaces the TOR switches 16 and the aggregation switches 18 in the data center 10. The switching function in the data center 30 is via the virtual fabric 50 which is FPGA-based and can use Open vSwitch (see www.openvswitch.org), Programming Protocol-Independent Packet Processors (P4, see www.p4.org), or the like. In addition to eliminating the leaf/spine (i.e., Clos) network switching layer, the virtual fabric 50 can incorporate processing functions from the servers 12 into the FPGAs 52, enabling global optimization of both data routing and VNF placement.

In the data center 30, Physical Network Functions (PNFs) 22 such as Passive Optical Network (PON) Optical Line Terminals (OLTs), wireless baseband units, IoT interfaces, etc. are connected directly to the virtual fabric 50 which is an FPGA layer. The FPGA layer provides data switching/routing functionality, such as via P4-based constructs, for example. The FPGA layer also provides a programmable infrastructure to implement some VNFs as well as data processing functions such as machine learning inference, video transcoding, storage compression, network acceleration, etc. FPGA benefits over CPUs/GPUs are very well documented, in terms of both power and computational speed. For example, the FPGA 52, is inherently programmable and reconfigurable, and is supported by modern, advanced EDA and software development tools using a variety of high level languages and programmable networking functions.

The virtual fabric 50 includes a flat interconnection architecture between FPGAs 52 which is efficient and is a low diameter network that minimizes data traversal. The flat interconnection architecture/network is a "compound graph" which is described herein where every FPGA 52 is a node in the network. The network can be uniform as well as a "compound graph" type network with a variety of embedded clusters of compact and localized FPGA nodes. These clusters of FPGAs may have preferentially smaller internal diameter by assigning specific ports for intra-cluster communications and the remaining ports for inter-cluster communications. FPGAs 52 within clusters can be placed in extremely close physical proximity of each other, ensuring lower power requirements and latency preferentially for intra-cluster communications.

While flat, the virtual fabric 50 still provides efficient connections on a single board, across the electrical backplane, and across long reach optical links for large scalability. The FPGA layer is programmable and incorporates i) switching functions (using P4 for example) dynamically optimized in both placement and sizing to accommodate desired VNFs and data processing functions, ii) VNFs and other processing functions optimized in size and location to improve resource utilization, performance, and lower power and latency, iii) an expandable 'virtual FPGA' where multiple FPGAs can appear as a single programmable resource, and iv) modern FPGAs which provide High Bandwidth Memory (HBM) interfaces which are readily integrated onto an interposer substrate with FPGA die, allowing for very fast Dynamic Random Access Memory (DRAM) access with low power consumption Also, the FPGAs 52 can provide direct interconnect integration of edge PMA/PHY functions (physical network function 22), and corresponding required signal processing. The FPGAs 52 inherently support virtually any signaling protocol and can be re-configured partially (a subset of the chip) or fully (whole chip). Partial reconfiguration at the sub-system or port level can be done without disturbing the other operating channels and protocols. This enables runtime reconfiguration of the fabric's data plane.

The CPU/GPU layer (the servers 12) can be substantially reduced in scope, with data processing being performed in the FPGA layer. However, some workloads may still require CPU/GPU servers 12, which are connected in a layer subtended from the FPGAs 52 or alternatively built into the FPGAs 52 with integrated CPU cores and DSP blocks (vector GPU functionality). WAN connections may be made directly from the FPGA layer, or through an intermediate gateway spine switch 20.

The processing power in modern FPGAs 52 can support over 12K DSP slices, capable of running at clock rates of 1 GHz, that can provide over 21T MAC/s (multiply-accumulate functions per second), and over 7T FLOPs of single precision floating point capability in a single device. These devices also providing multi-core (2, 4, 8) ARM8 CPUs, with 32 and 64-bit support in a single FPGA device, while also including multiple built-in PCIe gen4 hard macros and extensive, high capacity on-chip memory approaching several hundred Mbps, and external memory interfaces exceeding 2.67 Gb/s throughput in the DDR4 standard. Note that this horsepower does not include the FPGA's programmable logic fabric capacity and extensive multi-protocol capable SERDES blocks that can be configured to support up to terabit/s interfaces.

Figure 4:
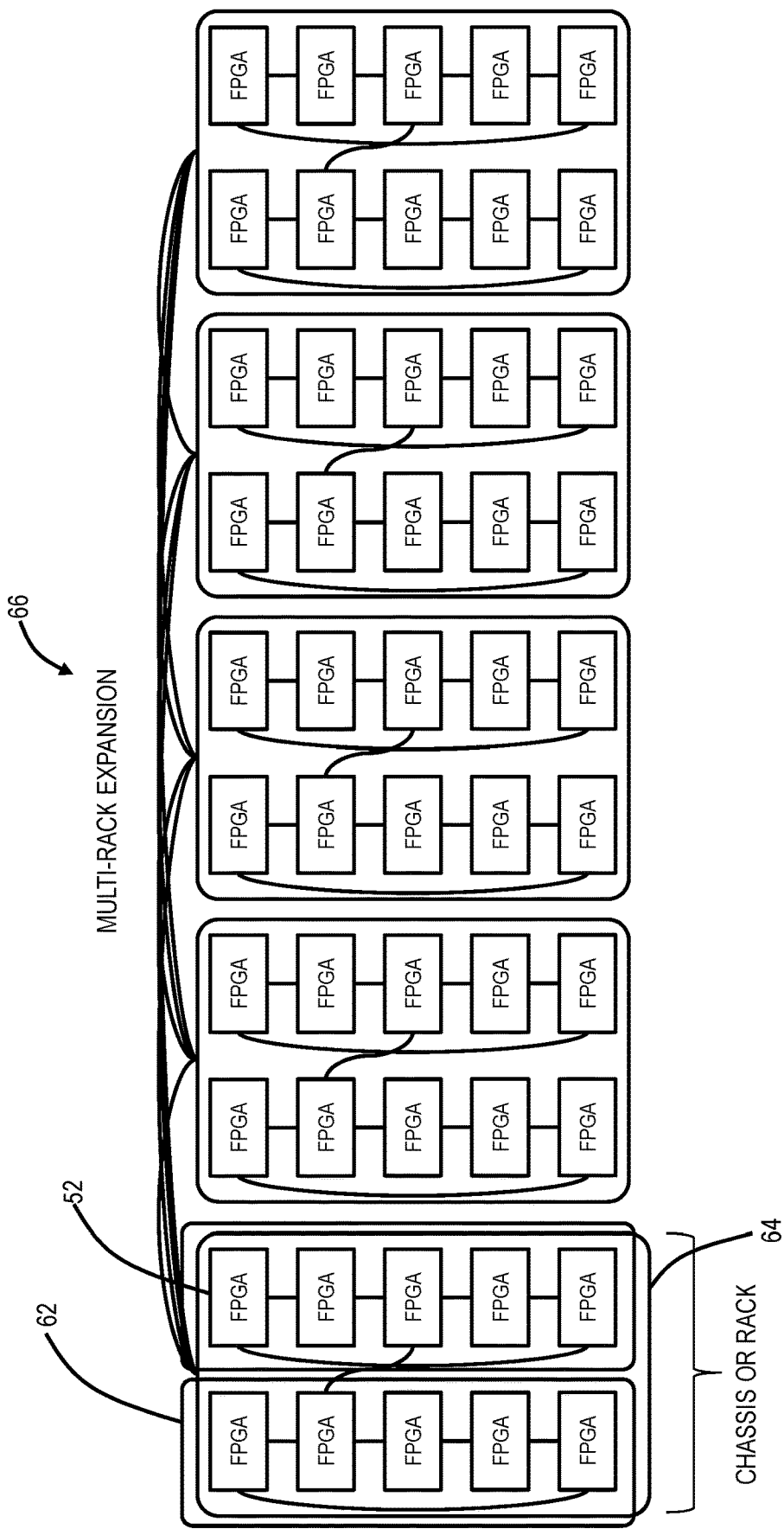
FIG. 4 is a block diagram of a hardware implementation of the virtual fabric.

FIG. 4 is a block diagram of a hardware implementation of the virtual fabric 50. The FPGAs 52 can be implemented in physical hardware. In an embodiment, various FPGAs 52 can be on a circuit pack 62 which is also referred to as a blade, board, module, line module, etc. The circuit pack 62 can include a Printed Circuit Board (PCB) with various traces interconnecting the various FPGAs 52. In some cases, a larger FPGA infrastructure may be required than can be delivered via a single circuit pack 62, in which case shelf level (within a rack) networking expansion or a further inter-shelf (inter-rack) expansion can be implemented. In an embodiment, multiple circuit packs 62 can be disposed in a chassis or rack 64. The interconnection between multiple circuit packs 62 can be via high-speed electrical interconnect (backplane) and/or COBO optics. Existing FPGA families from the major vendors support COBO, advanced packaging and dense interposer-based stacked die approaches today. COBO based architectures are seen to provide up to a 30% power savings of electrical SERDES based interconnects, as well as form-factor (size) improvements. Further, multiple chassis or racks 64 can be interconnected to form a larger hardware implementation 66. The interconnection for the larger hardware implementation 66 can also be via high-speed electrical interconnect (backplane) and/or COBO optics.

In an embodiment, the circuit packs 62 can include an optical interconnect implemented as an optical module embedded on the same circuit pack 62 with the FPGAs 52 with short distance electrical links between FPGAs 52 and the optical module. In another embodiment, the optical interconnect can be implemented with electrical coupling between an FPGA die and optical transceiver die within a multi-chip module or circuit pack 62.

Virtual Fabric Architecture

The virtual fabric 50 includes the "compound graph" flat network architecture. The internal data routing may be done via a distributed "compound graph"-like approach, or via more centralized approaches like Segment Routing, including congestion avoidance mechanisms.

Figure 5:
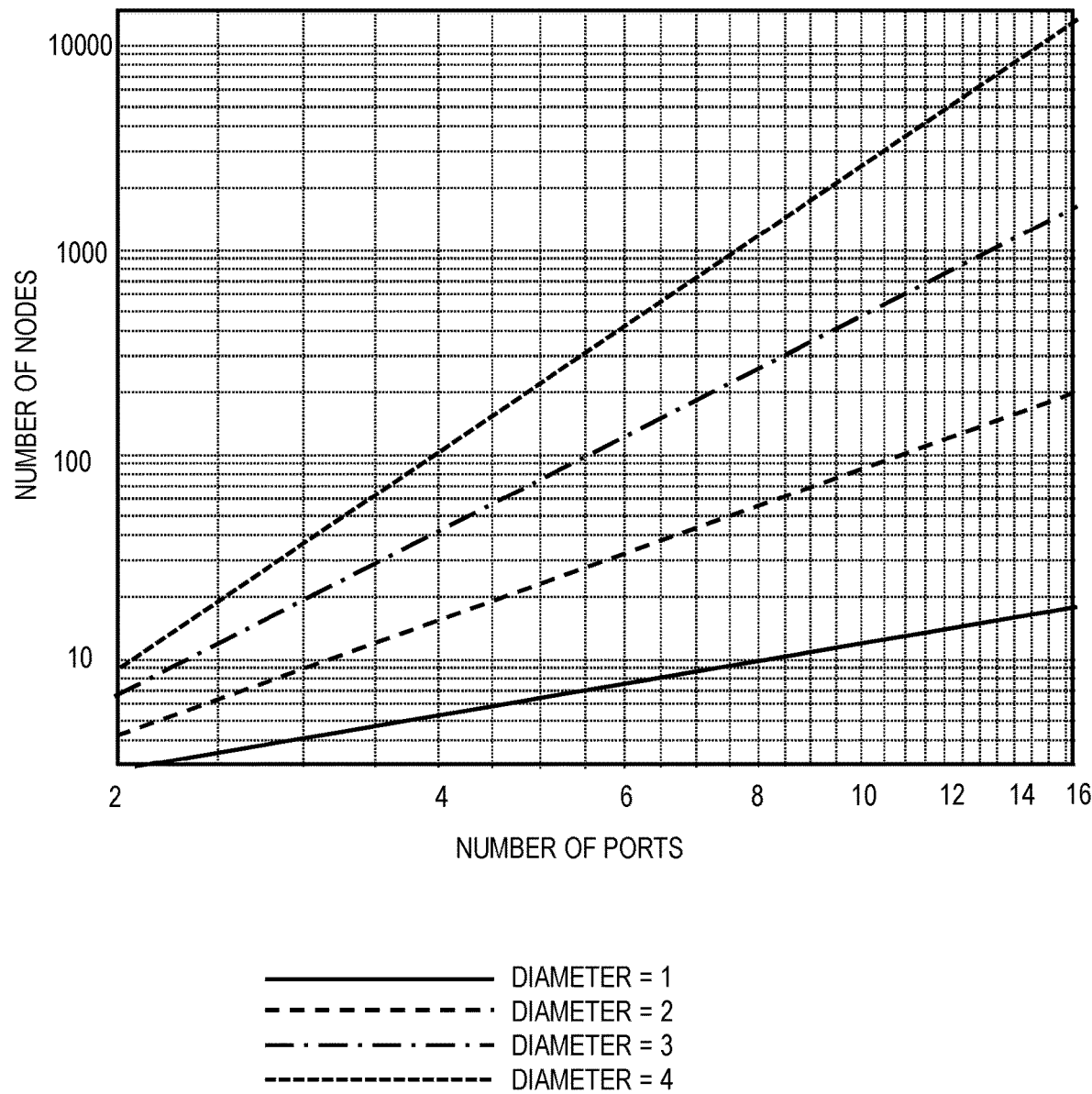
FIG. 5 is a graph of the number of possible interconnected FPGAs for network diameters 1 through 4.

Flat network architectures can vary from a fully connected network of n nodes with as many as n−1 ports (similar to complete graph $K_n$ of degree d=n−1, having diameter k=1), to a connected ring of n nodes with just 2 ports each and having diameter k equal to half of the number of nodes (equivalent to the cycle graph $C_n$). Within these two extremes, the number of nodes (i.e., FPGAs 52) n varies with degree d and diameter k approximately as follows, with this empirical dependence illustrated in FIG. 5 which is a plot of the number of possible interconnected FPGAs 52 for diameters 1 through 4. As can be seen, the virtual fabric 50 can accommodate networks with very large numbers of FPGAs having only 3 or 4 packet hops, and small port counts.

$$FPGA\ Count: n = \frac{d^{0.8389k+0.1532}}{0.1467(k-2)^2 + 0.7669}$$

Figure 6:
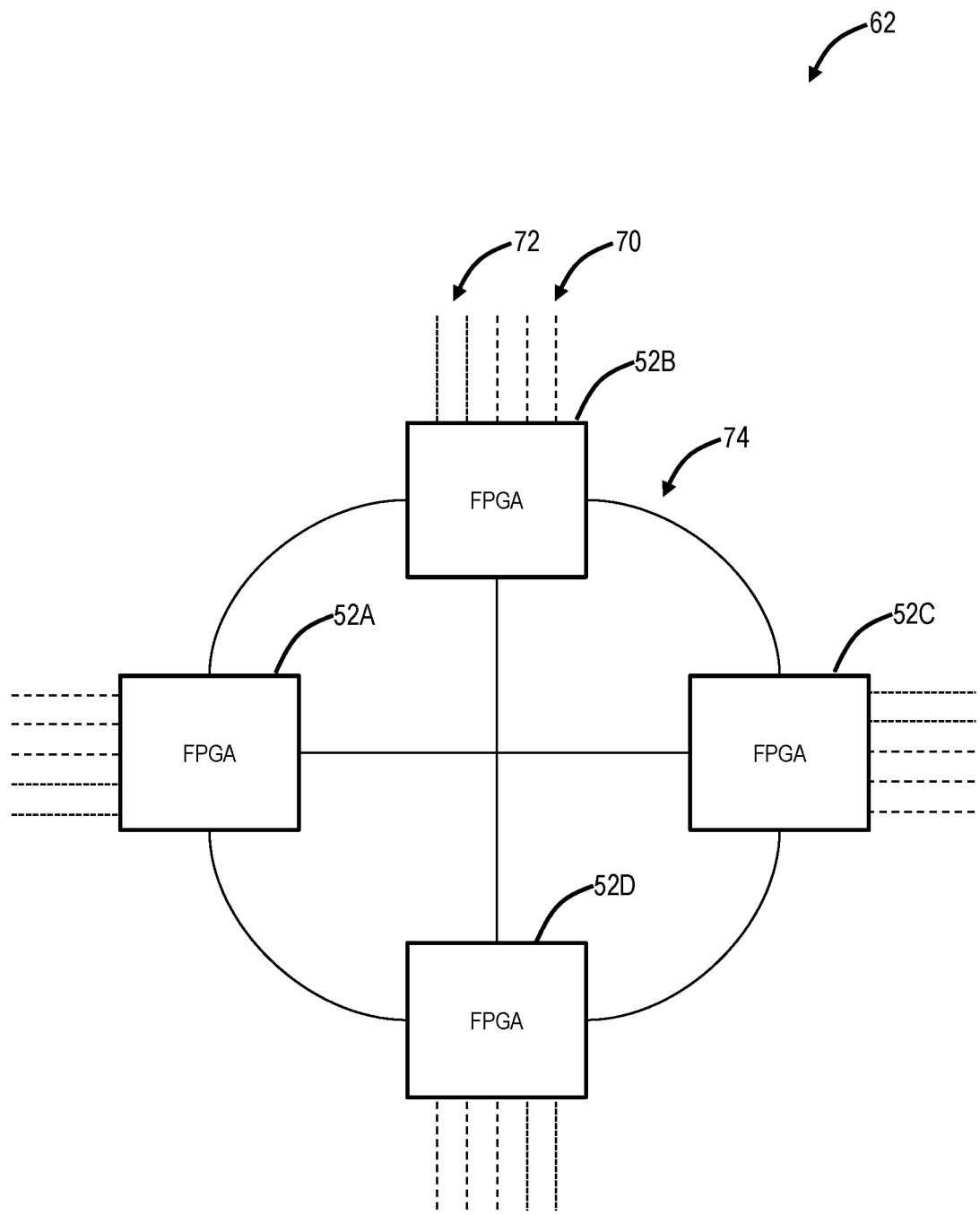

Based on physical (dimensions) and electrical (power dissipation) specified characteristics of FPGAs 52, 4 FPGAs can be accommodated in a single circuit pack 62 (CP). Due to extremely close physical proximity, it is possible to arrange the FPGAs in a circuit pack 62 in fully connected network architecture, as shown in FIG. 6. FIG. 6 is a block diagram of four FPGAs 52A-52D on a circuit pack 62. The FPGAs 52A-52D can be arranged in a fully connected network architecture with dashed lines 70 providing links to other circuit packs 62 on a shelf and dotted lines 72 providing links to other shelves. Those of ordinary skill in the art will recognize a circuit pack 62 (or blade, board, module, line module, etc.) may include more or less FPGAs 52.

To build a fully connected FPGA network with the FPGAs 52A-52D, three links 74 (i.e., 3 ports) are utilized. Each link 74 represents multiple parallel communication links running between adjacent FPGAs 52 and can be a Link Aggregation Group (LAG). These parallel communication links serve for command/control as well as parallel data processing and storage/retrieval, turning all FPGAs 52A-52D in a circuit pack 62 into one larger virtual FPGA. Note that no switching capability is needed at this stage because the fully connected network includes permanent end-to-end connections (links 74) without the need for relaying any data between the nodes.

There can be additional LAGs shown as the dashed lines 70 and the dotted lines 72, which are utilized for making connections between the FPGAs 52A-52D clustered in circuit packs 62 on the shelf and between shelves within the network architectures.

Figure 7:
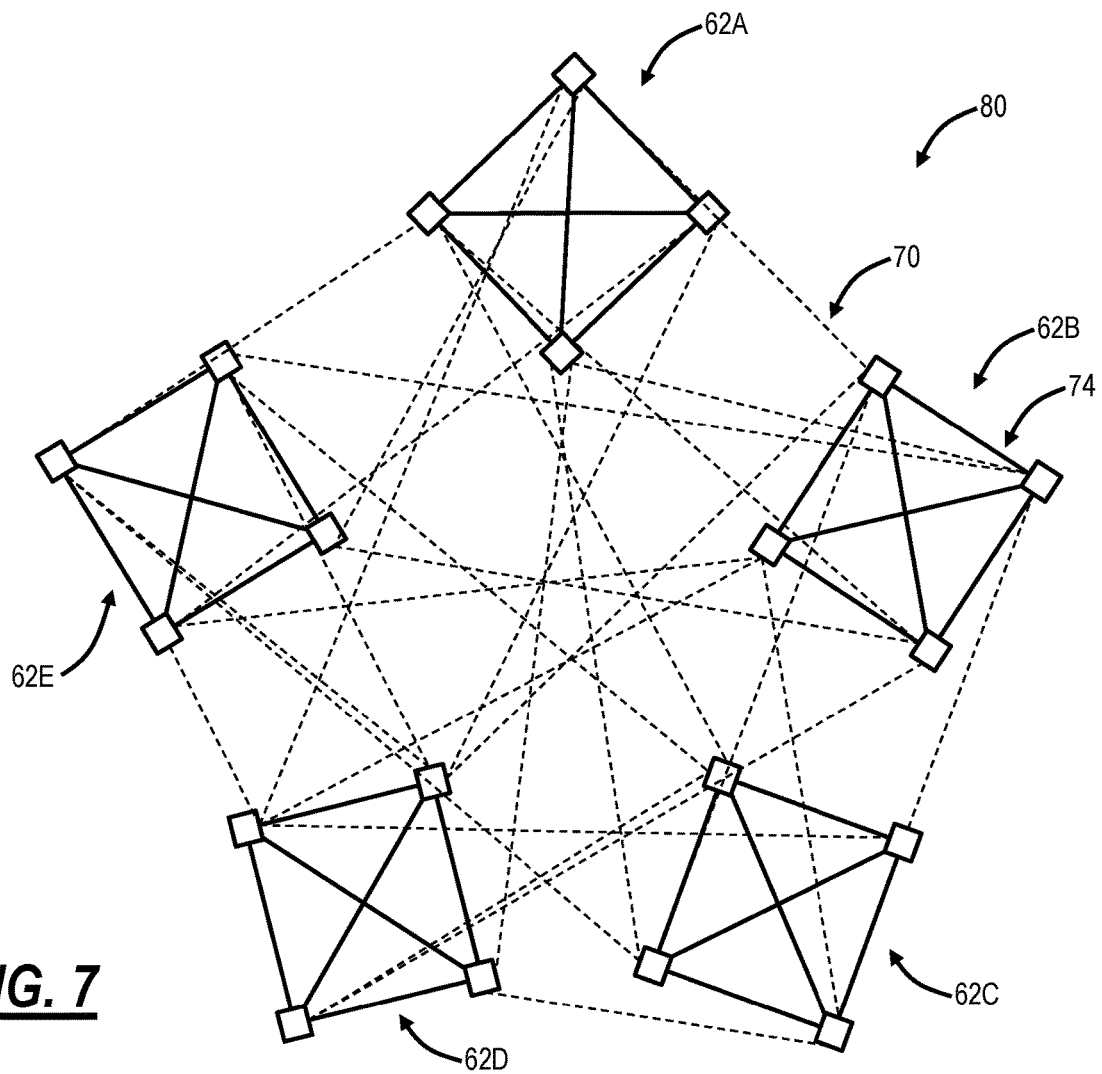
FIG. 7 is a network diagram of a shelf which supports five circuit packs from FIG. 6.

Assume, with the circuit pack 62 with four FPGAs 52A-52D is included in a shelf which supports five circuit packs 62, for handling cases where more than four FPGAs 52A-52D are required to handle workloads within a single shelf. The resulting network configuration is shown in FIG. 7. FIG. 7 is a network diagram of a shelf 80 which supports five circuit packs 62A-62E. In FIG. 7, the individual FPGAs 52A-52D are depicted as small squares, and the three intra-circuit pack LAGs are drawn as the solid links 74, while three inter-circuit pack LAGs are drawn as dashed lines 70—totaling six LAGs and resulting in 20 FPGAs with a diameter 2 (i.e., a maximum of 2 hops) clustered network in the shelf 80. In this case, switching functions (using P4 for example) are utilized to relay data between the FPGAs in a maximum of 2 hops.

Figure 8:
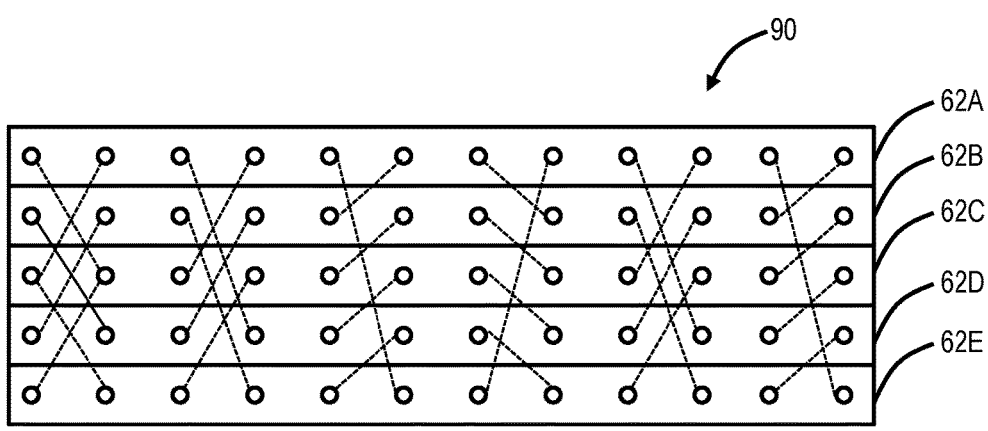
FIG. 8 is a block diagram of a physical implementation of a backplane for the shelf of FIG. 7 with five circuit packs.

FIG. 8 is a block diagram of a physical implementation of a backplane 90 for the shelf 80 with the circuit packs 62A-62E. The connections on the backplane 90 may be electrical traces, electrical cables, and/or optical cables. In FIG. 8, the shelf 80 is illustrated as five circuit packs 62A-62E and circles represent ports and dashed lines represent connections between circuit packs 62A-62E. Observe that the inherent structured property of "compound graph" networks allows a clean and well-organized backplane 90.

Figure 9:
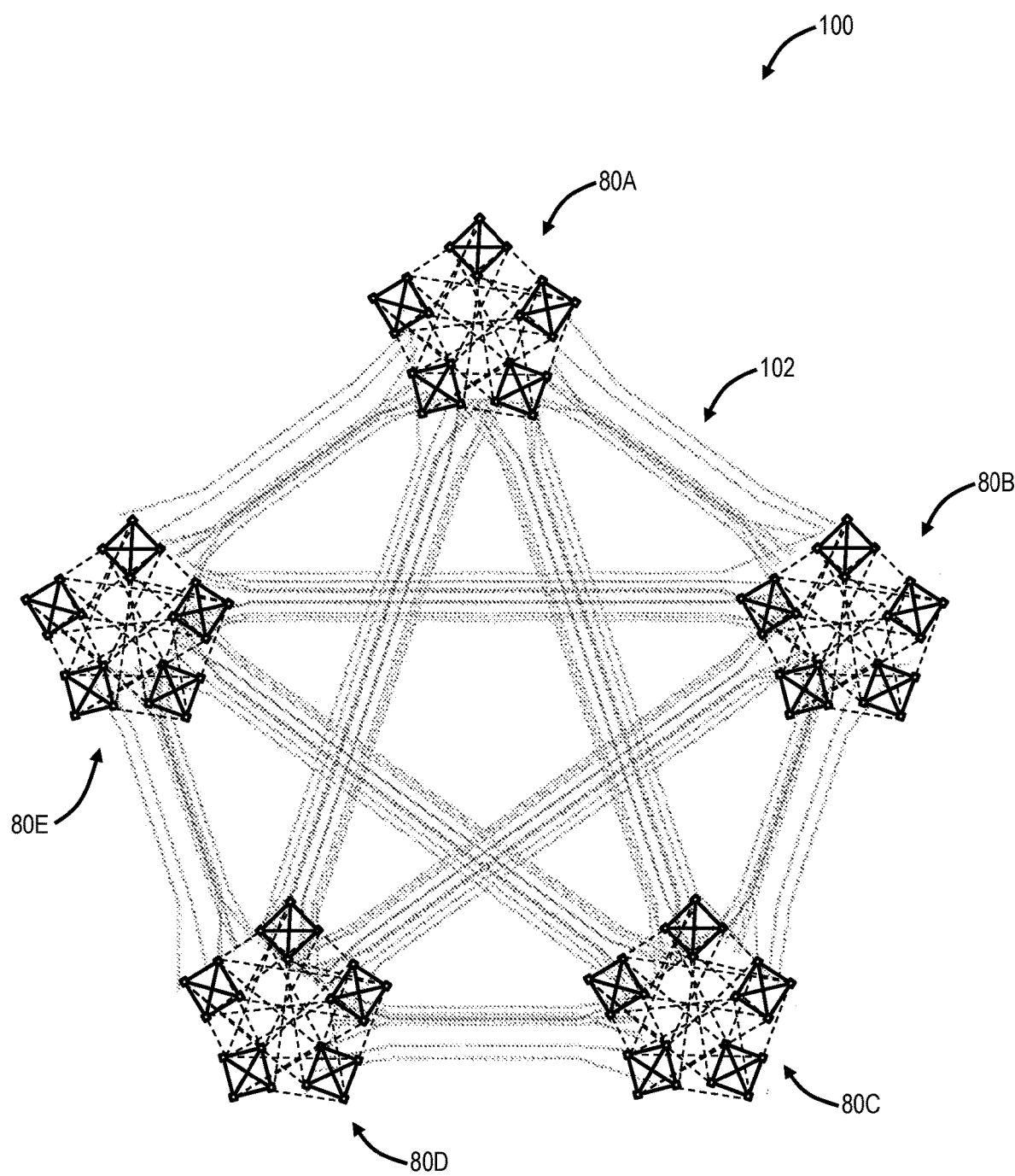
FIG. 9 is a network diagram of a multi-shelf configuration with five shelves interconnected in a symmetrical diameter 3 "compound graph" network.

FIG. 9 is a network diagram of a multi-shelf configuration 100 with five shelves 80A-80E interconnected in a symmetrical diameter 3 "compound graph" network with a total 100 FPGAs with the addition of just two more LAGs, drawn as dotted lines 102. Interconnections between each pair of shelves, preferably optical, are bundled together into parallel structured optical cables. Again, in this case, switching functions (using P4 for example) are utilized to relay data between the nodes in maximum of 3 hops.

Note, the FPGA interconnect networks described herein represent just one specific realization of clustered "compound graph" design. It is possible to build virtual FPGAs with a different total number of individual FPGAs and customized size and number of clusters.

Further, processing capability, cost, and power consumption of individual circuit packs 62 can be tailored to the application without changing the overall architecture. For example, there can be circuit packs 62 with fewer FPGAs and/or use FPGAs with fewer resources. Also, FPGA manufacturers generally have multiple offerings or "flavors" of FPGAs with different sets of grouped features (e.g., different combinations of IO, memory, DSP blocks, embedded CPUs, SERDES capabilities, customized, embedded hard macro functions, etc.). The number of links within a LAG may change, but the topology will stay fixed.

FIGS. 6, 7, and 9 illustrate the virtual fabric 50 as a compound graph. A compound graph is defined as follows: Given two regular graphs G and G1, a level-1 regular compound graph G(G1) is obtained by replacing each node of G by a copy of G1 and replacing each link of G by a link which connects the corresponding two copies of G1. A level-1 regular compound graph can be extended to level-i (i≥2) recursively. A level-i (i>0) regular graph Gi(G1) adopts a level-(i–1) regular graph Gi-1(G1) as a unit cluster and connects many such clusters by a regular graph G.

For example, G1 can be the circuit pack 62 in FIG. 6. The shelf 80 in FIG. 7 represents a level-1 compound graph where each node of G includes G1. Further, the multi-shelf configuration 100 in FIG. 9 is a level-2 compound graph where each node in the multi-shelf configuration 100 graph is a shelf 80.

Scalability

Figure 10:
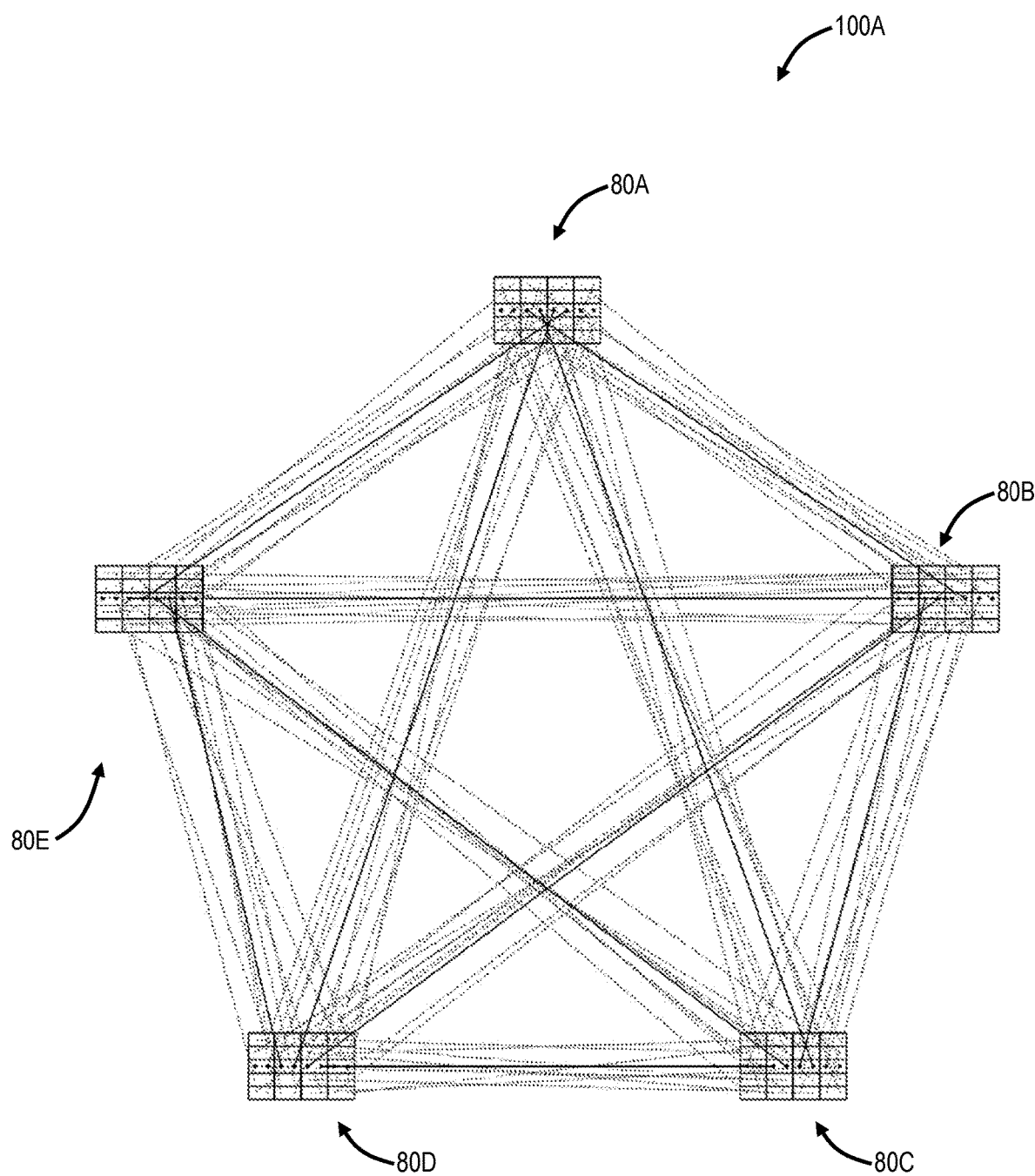
FIG. 10 is a network diagram of a multi-shelf configuration with five shelves each having a single circuit pack (which is the middle of each shelf).

With respect to a shelf 80, adding a circuit pack 62B guarantees its connection with the first circuit pack 62A within the same shelf through dashed backplane connections, as depicted in FIG. 8. FIG. 10 is a network diagram of a multi-shelf configuration 100A with five shelves 80A-80E each having a single circuit pack 62A (which is the center of each shelf 80). When adding second circuit pack 62B in a different shelf, it should be plugged in the slot having dotted link with the first one. Any additional circuit packs 62C-62E will be plugged in the slots having maximum connectivity with the populated ones. Standalone shelves are fully functional due to well-established backplane connections between circuit packs 62 populating it. Any first two shelves are interconnected with the single two-way structural, optical cable as in FIG. 9 and scaling up the network is easily achieved by shelf by shelf augmentation accompanied by the corresponding structural, optical cables.

The "compound graph" network architecture allows the gradual population of the shelves 80—starting with a single circuit pack 62A. The architecture guarantees unimpaired connectivity between the circuit packs 62 even in the extreme case when only single circuit pack 62 in each shelf is deployed, as illustrated in FIG. 10 (each circuit pack 62 is in the middle slot). The active LAG within the structured optical cables interconnecting shelves are highlighted as solid on top of non-active ones still dotted. The arrangement in FIG. 10 connects all the FPGAs in 5 solitary circuit packs 62A-62E in 5 separate shelves in 3 hops as in the fully populated case.

Note, the circuit packs 62, the shelves 80, and the multi-shelf configuration 100, 100A are presented for illustration purposes. In another embodiment, the FPGAs 52 can be incorporated in so-called "pizza boxes" which are rack-mounted units. That is, the virtual fabric 50 contemplates any form-factor for physical implementation, namely shelves and circuit packs, rack-mounted units, etc.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combination of certain functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A data center fabric comprising:
a plurality of Field Programmable Gate Arrays (FPGAs), each FPGA connected by a plurality of links with other FPGAs, a plurality of servers in a data center, and physical network functions associated with the data center, wherein the plurality of FPGAs and the plurality of links form a virtual fabric for switching between the FPGAs, the plurality of servers, and the physical network functions, wherein the virtual fabric is arranged with each FPGA being a node, each FPGA of the plurality of FPGAs being arranged in one of a plurality of clusters, wherein each FPGA in a cluster is directly interconnected to each of the other FPGAs in the cluster, and wherein each FPGA directly interconnects to multiple other FPGAs in other clusters with partial connectivity such that not every FPGA in different clusters is connected to one another, and wherein the plurality of links which interconnect the plurality of FPGAs are a Link Aggregation Group (LAG) where the plurality of links operate as a single aggregated link, wherein a number of links in any LAG may change while a topology of the virtual fabric remains fixed, and wherein each LAG is a parallel communication link between adjacent FPGAs with each FPGA configured for command/control as well as parallel data processing and storage/retrieval over the associated LAG.

2. The data center fabric of claim 1, wherein the plurality of FPGAs are utilized for switching functions in lieu of a leaf/spine architecture in the data center.

3. The data center fabric of claim 1, wherein the plurality of FPGAs are utilized for switching functions, Virtual Network Functions (VNFs), and for replacing one or more of the plurality of servers.

4. The data center fabric of claim 1, wherein the plurality of links include one or more of high-speed electrical interconnects and optical interconnects.

5. The data center fabric of claim 1, wherein the plurality of FPGAs are on a first module, wherein the plurality of links include
 a first set of links for interconnection between the plurality of FPGAs on the first module, and
 a second set of links for interconnection between the first module and a second module with a second plurality of FPGAs.

6. The data center fabric of claim 5, wherein the second set of links are over a backplane associated with a shelf housing the first module and the second module.

7. The data center fabric of claim 5, wherein the plurality of links further include a third set of links for interconnection between the first module in a first shelf and a third module in a second shelf.

8. The data center fabric of claim 1, wherein each cluster is in a different module.

9. The data center fabric of claim 8, wherein each module communicates to other modules via a backplane.

10. The data center fabric of claim 1, wherein there are one or more of intra-cluster LAGs and inter-cluster LAGs.

11. The data center fabric of claim 10, wherein all FPGAs within a cluster are fully connected by the intra-cluster LAGs whereas FPGAs in separate clusters are partially connected by the inter-cluster LAGs.

12. The data center fabric of claim 10, wherein the intra-cluster LAGs are electrical within a circuit pack and the inter-cluster LAGs are one or more of electrical over a backplane and optical.

13. The data center fabric of claim 10, wherein one or more of the inter-cluster LAGs include an associated FPGA having an electrical coupling to an optical transceiver circuit.

14. A network element comprising:
 one or more circuit packs, each circuit pack including a plurality of Field Programmable Gate Arrays (FPGAs), each FPGA connected by a plurality of links with other FPGAs, a plurality of servers in a data center, and physical network functions associated with the data center; and
 a shelf with a backplane communicatively coupling the one or more circuit packs to one another,
 wherein the plurality of FPGAs and the plurality of links form a virtual fabric for switching between the FPGAs, the plurality of servers, and the physical network functions,
 wherein the virtual fabric is arranged with each FPGA being a node, each FPGA of the plurality of FPGAs being arranged in one of a plurality of clusters, wherein each FPGA in a cluster is directly interconnected to each of the other FPGAs in the cluster, and wherein each FPGA directly interconnects to multiple other FPGAs in other clusters with partial connectivity such that not every FPGA in different clusters is connected to one another, and
 wherein the plurality of links which interconnect the plurality of FPGAs are a Link Aggregation Group (LAG) where the plurality of links operate as a single aggregated link, wherein a number of links in any LAG may change while a topology of the virtual fabric remains fixed, and wherein each LAG is a parallel communication link between adjacent FPGAs with each FPGA configured for command/control as well as parallel data processing and storage/retrieval over the associated LAG.

15. The network element of claim 14, further comprising:
 a second shelf with a backplane communicatively coupling a second set of one or more circuit packs to one another, wherein the second set of one or more circuit packs each include a plurality of FPGAs.

16. The network element of claim 15, wherein each circuit pack of the one or more circuit packs and the second set of one or more circuit packs are a cluster of localized FPGA nodes.

17. A method comprising:
 operating a first set of links between a plurality of Field Programmable Gate Arrays (FPGAs);
 operating a second set of links between the plurality of FPGAs and a plurality of servers in a data center;
 operating a third set of links between the plurality of FPGAs and physical network functions associated with the data center; and
 performing packet switching in the plurality of FPGAs between the plurality of FPGAs, the plurality of servers, and the physical network functions,
 wherein the plurality of FPGAs and the sets of links form a virtual fabric, and wherein the virtual fabric is arranged with each FPGA being a node, each FPGA of the plurality of FPGAs being arranged in one of a plurality of clusters, wherein each FPGA in a cluster is directly interconnected to each of the other FPGAs in the cluster, and wherein each FPGA directly interconnects to multiple other FPGAs in other clusters with partial connectivity such that not every FPGA in different clusters is connected to one another, and wherein the plurality of links which interconnect the plurality of FPGAs are a Link Aggregation Group (LAG) where the plurality of links operate as a single aggregated link, wherein a number of links in any LAG may change while a topology of the virtual fabric remains fixed, and wherein each LAG is a parallel communication link between adjacent FPGAs with each FPGA configured for command/control as well as parallel data processing and storage/retrieval over the associated LAG.

* * * * *